United States Patent Office 3,326,820
Patented June 20, 1967

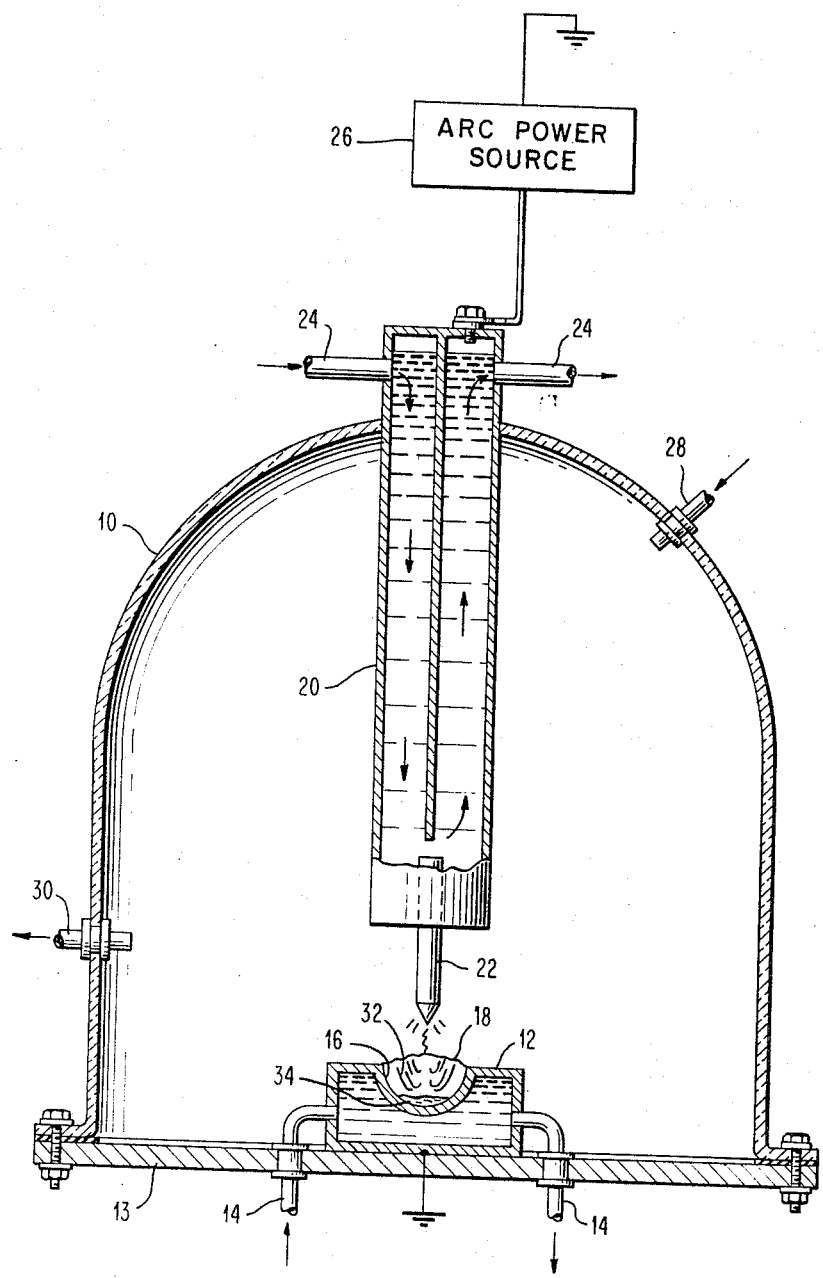

3,326,820
ARC PROCESS FOR FORMING HIGH MELTING POINT COMPOUNDS
Jerome J. Cuomo, New York, and Richard J. Gambino, Yorktown Heights, N.Y., assignors to International Business Machines Corporation, Armonk, N.Y., a corporation of New York
Filed Apr. 22, 1965, Ser. No. 450,056
15 Claims. (Cl. 252—478)

The present invention relates to a method for arc forming certain high melting point compounds. More particularly, it is related to a liquid-vapor process utilizing the energy of an electric arc for melting the solid and raising it to a reaction temperature.

Present day scientific technology is making ever increasing demands for new materials which have either been heretofore unavailable or available in forms which rendered scientific experimentation difficult or impossible. High on the list of materials which have received great interest in recent years are certain compounds of the rare earth elements, silicon, tungsten, and the like. These compounds include nitrides, carbides, etc. Due to the extremely high melting point of most of these compounds, it has been very difficult to make the desired compound at all. Further, when made, the resultant compound has not been of sufficient purity and of a physical nature which has permitted subsequent experimentation and device fabrication. In particular, it has been very difficult to form large high purity crystalline structures of the rare earth nitrides and these materials have received wide interest in the semiconductor and magnetics fields due to some of their unique properties. Prior art methods have usually produced crystals of insufficient purity or size to permit experimentation to any substantial degree.

Prior art processes of making the above enumerated compounds have included heating granulated or powdered metal in an atmosphere of the gas with which it is desired to react same or reacting a metal vapor and the gaseous compound directly. However, both of these processes tend to produce either a finely divided powder product or a hard coating on a largely unreacted body of the metal. In either event, the resultant compound is not of proper form, i.e., crystalline, for usual device experimentation due both to oxygen and other atmospheric contamination and also, to the contamination of the unreacted metal.

One specific prior art process for preparing rare earth nitrides has been by reacting the rare earth metal with hydrogen, grinding the brittle hydride thus formed to a powder in the absence of oxygen and water vapor, decomposing the powdered hydride at high temperature in vacuum and reacting the fine metal powder with nitrogen or ammonia at high temperature. It is usually necessary to repeat the metal nitrogen reaction several times with repeated grinding between each refiring in order to get complete reaction. The product from this procedure, as may be seen, is a fine powder which seldom contains the theoretical amount of nitrogen and which product has to be carefully protected from air.

It has now been found that an extremely efficient process for producing certain refractory compounds is possible utilizing the energy of an electric arc for both heating and stirring a molten pool of metal in a suitable atmosphere whereby the metal is reacted with the gas contained in the surrounding atmosphere to produce a desired compound. By utilizing additional features, such as a water-cooled container for the melt plus the fact that the compound formed has a higher melting point than the molten metal, precipitation of same occurs, thus, greatly increasing the completion or stoichiometry of the reaction.

It is accordingly a primary object of the present invention to provide an improved method for making high melting point compounds.

It is a further object to provide such a method utilizing an electric arc.

It is another object of the invention to provide such a method for producing large crystals of such compounds suitable for experimentation purposes.

It is still another object to provide such a method especially adapted for preparing rare earth nitrides.

It is a further object to provide such a method whereby solid solutions of mixtures of said materials may be formed.

The foregoing and other objects, features and advantages of the invention will be apparent from the following more particular description of preferred embodiments of the invention, as illustrated in the accompanying drawing:

In the drawing:

The figure is a cross-sectional view of a typical apparatus suitable for practicing the process of the present invention.

The objects of the present invention are accomplished in general by a method for making high melting point compounds of a metal and a second gaseous reaction product which comprises placing an electric arc melting apparatus including an electrode and a hearth for containing the product in a chamber suitable for evacuation. The metal is then placed in the hearth and the chamber is thoroughly flushed with an inert gas. A reaction gas is then introduced into the chamber and the metal in the hearth is then melted by the arc with sufficient arc intensity to cause stirring of said melt in the presence of the reaction gas, whereby the reaction product formed by the gas and the metal precipitates out to the bottom of said hearth due to the higher melting point of said reaction product than that of the molten metal and the steep temperature gradient in the melt between the bottom and the surface.

The above process is improved by discontinuing the reaction at some point, cooling same and turning the solidified material in the hearth over and repeating the operation to insure complete reaction of all of the free metal remaining in the hearth. Subsequently, the chamber may be again flushed with inert gas and the arc current raised in order to increase the temperature of the arc and, thus, melt the reaction product and subsequently, allowing same to cool wherein large crystallites of said reaction product are formed.

The significant features of the present process are believed to be the manner in which the chamber is thoroughly flushed with inert gas to avoid contamination and the application of a cooling medium to the hearth which almost completely prevents contamination of the melt by the hearth material. Copper hearths have been used in a number of experiments with no measurable amount of copper being found in the subsequent product. A further very significant feature of the invention is that wherein the melting operation and reaction occur at a temperature such that the melt is maintained at a temperature sufficient to maintain in a molten condition but low enough to allow the reaction product to precipitate to the bottom of the melt pool or hearth. This is because of the steep temperature gradient maintained across the melt in a vertical direction. The stirring action due to the arc current also insures thorough mixing and reaction of all the metal in the melt with the gas in the chamber as the reaction proceeds. The final processing step wherein the compound itself is melted due to the higher temperature arc is carried out in an atmosphere of the reactive gas to maintain the stoichiometry of the product. Ideally the pressure of the gas should exceed the decomposition pressure of the product.

Referring now specifically to the drawing, the figure discloses an apparatus capable of performing the process steps of the present invention. Referring to this figure, there is shown a furnace housing 10 having a base 13 which is adapted for making an air tight seal with the housing 10. The housing may conveniently be fabricated from quartz, glass or the like for viewing purposes. Located within the chamber 10 is a water-cooled electrode 12 which may be made of copper both for its heat conducton and current conduction characteristics. Means 14 are provided for passing a cooling medium such as water continuously through the electrode during the process to cool same. A depression 16 is formed in the upper surface of the electrode for receiving the solid metal to be reacted with the gas subsequently introduced into the chamber. These metal particles are designaed as 18 in the figure. The electrode structure comprises a water-cooled holder 20 and an electrode 22 preferably constructed of tungsten or a similar refractory metal. Cooling means 24 are utilized to introduce coolant into the electrode holder. An arc power source 26 is shown connected between the electrode holder and ground and, thus, supplies the power for maintaining the arc within the chamber. This arc power source may be any conventional regulatable welding or arc current power supply as is well known in the art. Preferably the present process would be carried out with a D.C. rather than A.C. source due to less electrode contamination of the melt as is well known. A gas input means is shown at 28 and is utilized to introduce both the inert flushing and the reactive gas into the chamber and outlet means 30 is used for removal of the gas from said chamber.

Referring now to the source material 18 located within the depression 16 of the copper anode, it will be noticed that the lines 32 are intended to illustrate the fluid circulation currents within the melt as the arc current passes therethrough, thus, introducing turbulence to the melt and greatly increasing the rate and degree of reaction.

The procedure for performing a reaction in the apparatus of the figure is generally as follows. The rare earth or other metal in the form of small pieces weighing between 0.5 and 2 grams is placed in the depression 16 in the water-cooled copper electrode 12. The melting chamber within the enclosure 10 and base 13 is alternately evacuated and back filled with high purity argon several times to insure an oxygen free atmosphere. The chamber is then filled with argon at a pressure about 1 p.s.i. above atmospheric pressure. The arc is struck and the metal in the depression 16 melted. Then the reactive gas, such as nitrogen, is introduced into the chamber in a continuous flow. On the first melting, the current of the arc is adjusted so that the metal is thoroughly melted without being vaporized. As the nitride is formed, the melting point of the ingot increases so that the degree of reaction can be gauged. While the reaction product tends to precipitate out, it will be understood that a certain amount of the metal will be included with the nitride precipitate and will be solidified by the cooled electrode 12. After the first melting, the chamber is exacuated and back filled with argon and the ingot is turned over so that the surface which had been in contact with the water-cooled copper hearth can be completely reacted using the same procedure and current setting as in the first melting. After the second reaction operation, the resultant ingot within the chamber 16 is densified, preferably in two additional melting operations in a nitrogen atmosphere. However, these subsequent melting steps must necessarily occur at a higher arc current to insure the melting of the very refractory reaction products.

A further very significant feature of the invention is that solid solutions of the reaction product of two different metals may be prepared by arc melting the two metals together in the desired proportions in argon to form a homogeneous alloy and then reacting the alloy with the reactive gas in the previously described manner. If large differences in the vapor pressures of the metals make the alloy formation difficult, the common reaction products, i.e., nitrides, may be formed separately by the process and the solid solution formed by subsequently arc melting the reaction products together after they are separately formed.

Utilizing the teachings of the present invention, crystallites of several millimeters in size have been formed in the resultant ingot of certain rare each nitrides which are believed to be among the first crystals of this size made from such materials.

While the present process has been found especially adaptable for making high purity crystals of rare earth nitrides, the process has been found equally suitable for making high purity reaction products with various other gases. Such products, for example, as carbides have been made using methane ($CH_4$) as the reactant gas, phosphides using phosphine ($PH_3$), sulfide utilizing hydrogen sulfide ($H_2S$), and selenides using hydrogen selenide ($H_2Se$).

It is believed that the present process provides a relatively inexpensive and direct method of making compounds which are the reaction product of a gas and a metal capable of being liquified wherein the reaction product has a higher melting point than the metal such that it will form a precipitate and generally fall to the bottom of the reaction vessel or chamber. As stated previously, it is necessary to maintain the steep temperature gradient across the melt to obtain the desired precipitation of the product.

Compounds which may be successfully made by the instant process are those having the general formula $M_x a_y$ wherein M is a metal selected from the group consisting of silicon, gallium, indium, aluminum, tantalum, boron, lanthanum, cerium, praseodymium, neodyminum, samarium, europium, gadolinium, terbium, dysprosium, holmium, erbium, thulium, ytterbium, lutetium, scandium, and yttrium; and A is an element chosen from the group consisting of nitrogen, phosphorus, carbon, sulfur, selenium, oxygen, and tellurium. $x$ and $y$ are the atomic ratio as determined by chemical valence. A suitable source for nitrogen would be nitrogen gas($N_2$). A suitable source for phosphorus would be phosphine gas ($PH_3$). A suitable source for carbon is methane ($CH_4$). A suitable source for sulfur is hydrogen sulfide ($H_2S$) and a suitable source for selenium would be hydrogen selenide ($H_2Se$).

As stated previously, while the instant process is satisfactory for producing the above enumerated compounds, it has particularly utility in the production of the rare earth nitrides, the rare earth metals being: lanthanum, cerium, praseodymium, neodymium, samarium, europium, gadolinium, terbium, dysprosum, holminum, erbium, thulium, ytterbium, lutetium, scandium, and yttrium. Due to the extremely high melting points of these nitrides, the present process offers one of the best methods known for producing relatively large size crystals having very low contamination and also extremely stoichiometric products, i.e., substantially all of the metal atoms being reacted with the nitrogen.

Having described the invention above, the following examples set forth the specific steps and procedures utilized in making a number of samples utilizing the teachings of the invention.

*Example I*

A sample of gadolinium metal weighing 5 grams was placed in an electro-polished copper hearth of a commercial arc melting furnace. The chamber was sealed and evacuated to a pressure of 10 microns. Ultra-high purity argon (Matheson Ionization Grade 99.999% minimum) was introduced into the chamber to a pressure of about 1 atmosphere. The system was evacuated and back filled at least 3 times to insure an oxygen free atmosphere. An arc was struck between a tungsten electrode and a tungsten counter electrode imbedded in the copper hearth. The gadolinium was then melted by the arc plasma in the argon atmosphere. With the sample still molten, the argon flow was stopped and nitrogen gas was introduced at a flow rate of 10 liters per minute. The arc was maintained for 1 minute after the nitrogen was introduced. The chamber was then evacuated, back filled with argon, the sample remelted, and the nitrogen reintroduced. This procedure was repeated 3 times. The arc current was approximately 170 amps at a potential of about 35 volts D.C. during the initial melting. Due to the increase in melting point of the partially nitrided gadolinium, the subsequent meltings were performed at an arc current of 230 amps. The system was pumped out, back filled and the samples removed.

The product was evaluated by metallographic, X-ray diffraction, and emission spectrographic analysis. Metallographic analysis showed the product to have an average grain size of 50 microns and to contain less than 1% unreacted metal and less than 1% voids. X-ray diffraction showed the product to be single phase gadolinium nitride with a lattice constant of 4.999 A. Emission spectrographic analysis showed no increase in impurity content such as copper and tungsten.

*Example II*

Two samples of gadolinum metal and one sample of yttrium metal were melted in an argon nitrogen atmosphere by means of an arc on a water-cooled copper plate in substantially the same manner as Example I. They were tested for unreacted gadolinium with a magnet and no unreacted gadolinium was found in the smaller sample. Metallographic examination showed that the samples were essentially single phase nitride. Vickers diamond penetration micro-hardness was measured and found to be 895 H.V. (50 grams) for yttrium nitride and 644 H.V. (150 grams) for gadolinium nitride as compared with about 130 H.V. (50 grams) for the starting metals.

*Example III*

Similar runs to those of Examples I and II were made for lanthanum nitride, neodymium nitride, europium nitride, dysprosium nitride, holmium nitride, erbium nitride, and yttrium nitride and also for a solid solution of gadolinium nitride-cerium nitride, gadolinium nitride-ytterbium nitride, and gadolinium nitride-europium nitride. The results of all of these runs indicated a very dense end product having a very small portion of unreacted metal.

It may be seen from the above description of the instant process and the examples that the process affords a very direct and economical method for preparing the above enumerated compounds. The process has the following major advantages. It is very rapid and simple so that oxygen contamination can be effectively eliminated. The end product is in the form of a dense ingot suitable for the fabrication of devices and is much more resistant to hydrolysis than the fine powders previously obtained. The ingot purity is easily maintained since the melt is only in contact with a thin layer of solid of the same composition on the water-cooled hearth. The method is well suited for the preparation of solid solutions of these materials so that compositions of varied and controllable physical properties can be obtained. Relative to the preparation of the solid solutions, it will be remembered that they may be prepared in one of two ways, either by the concurrent reaction of two different metals as an alloy in the reaction chamber or by the remelting of the two compounds which have been previously prepared separately by the instant process. The present process, thus, makes available a number of compounds and especially the rare earth nitrides which were either previously unavailable or available only at much higher cost.

It should perhaps also be noted that most of these compounds and especially the gadolinium compounds have very high neutron cross sections which makes them very valuable as potential neutron absorbers. The prospective uses in the atomic energy fields might be for control rods or neutron shields.

While the invention has been particularly shown and described with reference to preferred embodiments thereof, it will be understood by those skilled in the art that the foregoing and other changes in process details may be made therein without departing from the spirit and scope of the invention.

What is claimed is:
1. A method for forming the reaction product between a metal and a component of a reactive gas, said product having the general formula: $M_xA_y$ wherein the element M is at least one member selected from the group consisting of: silicon, gallium, indium, aluminum, tantalum, boron, lanthanum, cerium, praseodymium, neodymium, samarium, europium, gadolinium, terbium, dysprosium, holmium, erbium, thulium, ytterbium, lutetium, scandium, and yttrium; and the element A is one member selected from the group consisting of: nitrogen, phosphorus, carbon, sulfur, and selenium; and wherein $x$ and $y$ are the atomic ratios determined by chemical valence, said process comprising:

placing the element M in a suitable crucible;

melting the element in an electric arc in an atmosphere containing only the reactive gas as an active component of said atmosphere, said reactive gas containing an element A in a form wherein it will combine with the element M in the arc environment; and maintaining the temperature of the molten element below the melting point of the compound until all of the element is reacted.

2. A method as set forth in claim 1 above including the steps of:

raising the temperature of the melt after the element M is substantially reacted with the element A by increasing the arc power to melt the compound formed by the combining of the element M and the element A to densify same;

carrying out said temperature raising step in an atmosphere containing said element A as the reactive component; and subsequently cooling said product.

3. A process as set forth in claim 1 above including:

continually cooling the crucible containing said element M during the melting steps, whereby molten material in intimate contact with said crucible will solidify without substantial reaction therewith and whereby a steep temperature gradient is maintained across the melt.

4. A method for forming the reaction product between a metal and a gas, said product having the general formula: MP wherein the element M is at least one member selected from the group consisting of: gallium, indium, aluminum, tantalum, boron, lanthanum, cerium, praseodyminum, neodymium, samarium, europium, gadolinium, terbium, dysprosium, holmium, erbium, thulium, ytterbium, lutetium, scandium, and yttrium; and the element P is phosphorus, the source of said phosphorous being phosphine gas, said process comprising:

melting the element M in an electric arc in an atmosphere containing only phosphine gas as the reactive component of said atmosphere;

maintaining the arc current and, thus, the temperature of the molten element M below the melting point of the compound until substantially all of said element M is reacted;

subsequently raising the arc current and, thus, the temperature of the melt to liquify the formed compound and densify same; and subsequently cooling said product.

5. A method for forming the reaction product between a metal and a gas, said product having the general formula: $M_xS_y$ wherein the element M is at least one member selected from the group consisting of: gallium, indium, aluminum, tantalum, lanthanum, cerium, praseorymium, neodymium, samarium, europium, gadolinium, terbium, dysprosium, holmium, erbium, thulium, ytterbium, lutetium, scandium, and yttrium; and the element S is sulfur, the source of said sulfur being hydrogen sulfied; and where $x$ and $y$ are the atomic ratios determined by chemical valence, said process comprising:

melting the element M in an electric arc in an atmosphere containing only hydrogen sulfide as the reactive component of said atmosphere;

maintaining the arc current and, thus, the temperture of the molten element M below the melting point of the compound until substantially all of said element M is reacted;

subsequently raising the arc current and, thus, the temperature of the melt to liquify the formed compound and densify same; and subsequently cooling said product.

6. A method for forming the reaction product between a metal and a gas, said product having the general formula: $M_xSe_y$ wherein the element M is at least one member selected from the group consisting of: gallium, indium, aluminum, tantalum, lanthanum, cerium, praseodymium, neodymium, samarium, europium, gadolinium, terbium, dysprosium, holmium, erbium, thulium, ytterbium, lutetium, scandium, and yttrium; and the element Se is selenium, the source of said selenium being hydrogen selenide; and wherein $x$ and $y$ are atomic ratios determined by chemical valence, said process comprising:

melting the element M is an electric arc in an atmosphere containing only hydrogen selenide as the reactive component of said atmosphere;

maintaining the arc current and, thus, the temperature of the molten element M below the melting point of the compound until substantially all of said element M is reacted;

subsequently raising the arc current and, thus, the temperature of the melt to liquify the formed compound and densify same; and subsequently cooling said product.

7. A method for forming the reaction product between a metal and a gas, said product having the general formula: $M_xC_y$ wherein the element M is at least one member selected from the group consisting of: silicon, indium, aluminum, tantalum, boron, lanthanum, cerium, praseodymium, neodymium, samarium, europium, gadolinium, terbium, dysprosium, holmium, erbium, thulium, ytterbium, lutetium, scandium, and yttrium; and the element C is carbon, the source of said carbon being methane; and wherein $x$ and $y$ are atomic ratios determined by chemical valence, said process comprising:

melting the element M in an electric arc in an atmosphere containing only methane as the reactive component of said atmosphere;

maintaining the arc current and, thus, the temperature of the molten element M below the melting point of the compound until substantially all of said element M is reacted;

subsequently raising the arc current and, thus, the temperature of the melt to liquify the formed compound and densify same; and subsequently cooling said product.

8. A method for forming the reaction product between a metal and a gas, said product having the general formula: $M_xN_y$ wherein the element M is at least one member selected from the group consisting of: silicon, gallium, indium, aluminum, tantalum, boron, lanthanum, cerium, praseodymium, neodymium, samarium, europium, gadolinium, terbium, dysprosium, holmium, erbium, thulium, ytterbium, lutetium, scandium, and yttrium; and the element N is nitrogen, the source of said nitrogen being nitrogen gas; and wherein $x$ and $y$ are atomic ratios determined by chemical valence, said process comprising:

melting the element M in an electric arc in an atmosphere containing only nitrogen gas as the reactive component of said atmosphere;

maintaining the arc current and, thus, the temperature of the molten element M below the melting point of the compound until substantially all of said element M is reacted;

subsequently raising the arc current and, thus, the temperature of the melt to liquify the formed compounds and densify same; and subsequently cooling said product.

9. A method for forming rare earth nitrides having the general formula: MN wherein the element M is at least one member selected from the group consisting of: the rare earth elements, lanthanum, cerium, praseodymium, neodymium, samarium, europium, gadolinium, terbium, dysprosium, holmium, erbium, thulium, ytterbium, lutetium, scandium, and yttrium; and the element N is nitrogen, the source of said nitrogen being nitrogen gas, said process comprising:

melting the rare earth element in an electric arc in an atmosphere containing only nitrogen gas as the reactive component of said atmosphere;

maintaining the arc current and, thus, the temperature of the molten rare earth element M below the melting point of the formed nitride until substantially all of said element M is reacted;

subsequently raising the arc current and, thus, the temperature of the melt to liquify the formed nitride compound and densify same; and subsequently cooling said product.

10. A method for forming a solid solution of the reaction products between at least two elements and a single reactive gas, each of said products having the general formula: $M_xA_y$ wherein the element M is a member selected from the group consisting of: gallium, indium, aluminum, tantalum, boron, lanthanum, cerium, praseodymium, neodymium, samarium, europium, gadolinium, terbium, dysprosium, holmium, erbium, thulium, ytterbium, lutetium, scandium, and yttrium; and the element A is one member selected from the group consisting of: nitrogen, phosphorus, carbon, sulfur, and selenium; and wherein $x$ and $y$ are atomic ratios determined by chemical valence, said process comprising:

placing the elements M in a crucible concurrently for melting operations;

melting said elements M in an electric arc in an atmosphere containing only the single reactive gas as an active component of said atmosphere, said reactive gas containing one of the members of the element A in a form wherein it will combine with the element in the arc environment;

maintaining the temperature of the molten elements M below the melting point of the individual compounds formed until substantially all of said elements M are reacted; and raising the temperature of the melt subsequently by increasing the arc power to melt the compounds formed and densify same.

11. A method for forming a solid solution of the reaction products between at least two elements and a single reactive gas, each of said products having the general formula: $M_xA_y$ wherein the element M is a member of the group consisting of: gallium, indium, aluminum, tantalum, boron, lanthanum, cerium, praseodymium, neodymium, samarium, europium, gadolinium, terbium, dysprosium, holmium, erbium, thulium, ytterbium, lutetium, scandium, and yttrium; and the element A is one member chosen from the group consisting of: nitrogen, phosphorus, carbon, sulfur, and selenium; and wherein $x$ and $y$ are atomic ratios determined by chemical valence, said process comprising:

placing the elements M in separate crucibles suitable for melting operations;

melting each of the elements M separately in an electric arc in an atmosphere containing only the single reactive gas as the reactive component of said atmosphere, said reactive gas containing one of the elements A in a form wherein it will combine with the element M in the arc environment;

maintaining the temperature of the molten elements M below the melting point of the individual compounds formed until all of said elements are reacted;

subsequently placing the individual compounds separately formed from each of the elements M in a single container;

melting said compounds in an atmosphere of the reactive gas with sufficient arc power to completely liquify both of said compounds; and subsequently cooling same whereby a solid solution of the compounds is formed.

12. A method of densifying high melting point refractory nitrides having the general formula: $M_xN_y$ wherein the element M is a member of the group consisting of: gallium, indium, aluminum, tantalum, boron, lanthanum, cerium, praseodymium, neodymium, samarium, europium, gadolinium, terbium, dysprosium, holmium, erbium, thulium, ytterbium, lutetium, scandium, and yttrium; and the element N is nitrogen and wherein $x$ and $y$ are atomic ratios determined by chemical valence, said process comprising:

placing same in a water-cooled hearth of an electric arc melting apparatus;

surrounding same with an atmosphere of nitrogen;

striking an arc whereby said nitride is melted; and subsequently discontinuing said arc and allowing the melted nitride to cool while continuously maintaining said nitrogen atmosphere.

13. A method for forming a solid solution of the reaction products of cerium and gadolinium with nitrogen, said process comprising:

placing the elements cerium and gadolinium in a crucible concurrently for melting operations;

melting said elements in an electric arc in an atmosphere of substantially pure nitrogen gas;

maintaining the temperature of the molten elements cerium and gadolinium below the melting point of the individual compounds formed until substantially all of said elements are reacted; and raising the temperature of the melt subsequently by increasing the arc power while maintaining the nitrogen atmosphere to melt the nitride compounds formed and densify same.

14. A method for forming a solid solution of the reaction products of gadolinium and ytterbium with nitrogen, said process comprising:

placing the elements ytterbium and gadolinium in a crucible concurrently for melting operations;

melting said elements in an electric arc in an atmosphere of substantially pure nitrogen gas;

maintaining the temperature of the molten elements ytterbium and gadolinium below the melting point of the individual compounds formed until substantially all of said elements are reacted; and raising the temperature of the melt subsequently by increasing the arc power while maintaining the nitrogen atmosphere to melt the nitride compounds formed and densify same.

15. A method for forming a solid solution of the reaction products of europium and gadolinium with nitrogen, said process comprising:

placing the elements europium and gadolinium in a crucible concurrently for melting operations;

melting said elements in an electric arc in an atmosphere of substantially pure nitrogen gas;

maintaining the temperature of the molten elements europium and gadolinium below the melting point of the individual compounds formed until substantially all of said elements are reacted; and raising the temperature of the melt subsequently by increasing the arc power while maintaining the nitrogen atmosphere to melt the nitride compounds formed and densify same.

References Cited

UNITED STATES PATENTS

| | | | |
|---|---|---|---|
| 3,178,259 | 4/1965 | Foster et al. | 23—347 X |
| 3,211,664 | 10/1965 | Endebrock | 252—301.1 |
| 3,284,550 | 11/1966 | Riley et al. | 264—.5 |

OTHER REFERENCES

"Preparation and Properties of Cast UN," Endebrock et al. BMI-1690, Aug. 28, 1964, pp. 2–7.

CARL D. QUARFORTH, *Primary Examiner.*

S. J. LECHERT, JR., *Assistant Examiner.*